(12) United States Patent
Xu et al.

(10) Patent No.: US 10,509,505 B2
(45) Date of Patent: Dec. 17, 2019

(54) IN-CELL TOUCH PANEL AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Rui Xu, Beijing (CN); Ming Yang, Beijing (CN); Shuai Han, Beijing (CN); Haisheng Wang, Beijing (CN); Xi Chen, Beijing (CN); Hailin Xue, Beijing (CN); Xue Dong, Beijing (CN); Shengji Yang, Beijing (CN); Weijie Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 567 days.

(21) Appl. No.: 14/903,353

(22) PCT Filed: Jun. 19, 2015

(86) PCT No.: PCT/CN2015/081924
§ 371 (c)(1),
(2) Date: Jan. 7, 2016

(87) PCT Pub. No.: WO2016/119379
PCT Pub. Date: Aug. 4, 2016

(65) Prior Publication Data
US 2016/0370919 A1    Dec. 22, 2016

(30) Foreign Application Priority Data

Jan. 26, 2015    (CN) .......................... 2015 1 0038744

(51) Int. Cl.
*G06F 3/041*    (2006.01)
*G06F 3/044*    (2006.01)
(Continued)

(52) U.S. Cl.
CPC ............ *G06F 3/0416* (2013.01); *G06F 3/044* (2013.01); *G06F 3/0412* (2013.01);
(Continued)

(58) Field of Classification Search
None
See application file for complete search history.

(56) References Cited

U.S. PATENT DOCUMENTS

2003/0071943 A1    4/2003    Choo et al.
2005/0275610 A1*   12/2005   Roh ..................... G09G 3/3614
                                                           345/88
(Continued)

FOREIGN PATENT DOCUMENTS

CN    1705007 A        12/2005
CN    2899006    *    5/2007    ............... G09F 9/33
(Continued)

OTHER PUBLICATIONS

Internationai Search Report & Written Opinion of the International Searching Authority Appln. No. PCT/CN2015/081924; dated Sep. 25, 2015.
(Continued)

*Primary Examiner* — Benjamin C Lee
*Assistant Examiner* — Krishna P Neupane
(74) *Attorney, Agent, or Firm* — Ladas & Parry LLP

(57) ABSTRACT

An in-cell touch panel and a display apparatus are provided. The in-cell touch panel includes a lower substrate (1) and an upper substrate (2) disposed oppositely, a number of self-capacitive electrodes (03) independently of each other and located between the lower substrate (1) and the upper substrate (2), a drive chip (3), and wires (04) being configured to connect the self-capacitive electrodes (03) to the drive chip (3). A number of sub-pixels (01) arranged regularly and data lines (02) located between adjacent twos of columns of sub-pixels (01) exist between the upper substrate (2) and the lower substrate (1), each of the sub-pixels (1) is connected to the drive chip (3) through a data line (05) located on one side of it; two sub-pixels (01) adjacent to each other constitute one pixel, or three sub-pixels (01) adjacent to each other constitute two pixels, so that at least one sub-pixel (01) is shared by adjacent pixels. With the
(Continued)

in-cell touch panel, integration of touch control and display can be achieved without adding channels of the drive chip (3), and in turn, cost of the in-cell touch panel is reduced.

20 Claims, 11 Drawing Sheets

(51) Int. Cl.
    *G09G 3/20*         (2006.01)
    *G09G 3/3225*     (2016.01)
    *G09G 3/36*         (2006.01)

(52) U.S. Cl.
    CPC ......... *G09G 3/3225* (2013.01); *G09G 3/3648* (2013.01); *G06F 2203/04111* (2013.01); *G09G 3/2003* (2013.01); *G09G 2230/00* (2013.01); *G09G 2300/0408* (2013.01); *G09G 2300/0452* (2013.01)

(56) References Cited

U.S. PATENT DOCUMENTS

2012/0049726 A1*   3/2012   Yoo .................... H01L 27/3213
                                                        313/504

2015/0085208 A1*   3/2015   Lee ....................... G06F 3/0412
                                                        349/12
2016/0026291 A1*   1/2016   Zhao ...................... G06F 3/044
                                                      345/174

FOREIGN PATENT DOCUMENTS

| CN | 2899066 Y | 5/2007 | |
|----|-----------|--------|---|
| CN | 104142772 A | 11/2014 | |
| CN | 104142772 | * 12/2014 | ............ G06F 3/044 |
| CN | 104536632 A | 4/2015 | |

OTHER PUBLICATIONS

First Chinese Office Action Appln. No. 201510038744.7; dated Mar. 10, 2016.
Third Chinese Office Action dated Jan. 19, 2017; Appln. No. 201510038744.7.
Secon Chinese Office Action dated Aug. 12, 2016; Appln. No. 201510038744.7.

\* cited by examiner

IN-CELL TOUCH PANEL AND DISPLAY APPARATUS

TECHNICAL FIELD

Embodiments of the present invention relate to an in-cell touch panel and a display apparatus.

BACKGROUND

With the rapid development of the display technology, touch panels (Touch Screen Panels) have gradually spread all over people's lives. Generally, touch panels can be classified into an add-on mode touch panel, an on-cell touch panel, and an in-cell touch panel according to the composition and structure. For the add-on touch panel, a touch panel and a liquid crystal display (LCD) are produced separately, and then they are attached together to form a liquid crystal display panel having a touch function. The add-on touch panel suffers from the drawbacks of a higher production cost, a lower light transmittance, a thicker module and so on. While for an in-cell touch panel, touch electrodes of the touch panel are embedded inside a liquid crystal display panel, so that overall thickness of the module can be thinned, and the production cost of the touch panel can be reduced greatly as well, and thus it gets the favor of the major panel manufactures.

With respect to an in-cell touch panel, detection of touch location of a finger is achieved by using the principle of mutual capacitance or self-capacitance. A plurality of self-capacitive electrodes disposed in the same layer and insulated from each other may be arranged in the touch panel by using the principle of self capacitance. When a human body does not touch the panel, the capacitance born on each self-capacitive electrode is a fixed value. When a human body contacts the panel, the capacitive born on a corresponding self-capacitive electrode is the fixed value plus the body capacitance. With the touch detection chip, the touch location can be judged by detecting the change of capacitance value of each self-capacitive electrode in a touch period. In view of the fact that the body capacitance can act on all self capacitances, as compared with the mode in which the body capacitance can merely act on the projective capacitance in mutual capacitances, the amount of touch change caused by touch of a human body with the panel will be larger than that of a touch panel produced by using the principle of mutual capacitance. So, relative to a touch panel with mutual capacitance, the signal to noise ratio of touch can be effectively raised by a touch panel with self capacitance. Thus, the accuracy of touch sensing is enhanced.

However, when an in-cell touch panel is produced generally, it is required that additional touch-control chips and circuit boards be provided for touch-control function. Thus, although thickness of the whole module can be cut down with this design, the entire cost is promoted greatly.

SUMMARY

According to embodiments of the present invention, there are provided an in-cell touch panel and a display apparatus, for achieving integration of touch control and display into the same chip. Integration of touch control and display can be achieved without adding channels of a drive chip, and in turn, cost of the in-cell touch panel is reduced.

According to an embodiment of the invention, there is provided an in-cell touch panel, comprising an upper substrate and a lower substrate disposed oppositely, a plurality of self-capacitive electrodes independently of each other and located between the lower substrate and the upper substrate, a drive chip, and wires being configured to connect the self-capacitive electrodes to the drive chip; wherein, a plurality of sub-pixels arranged regularly and data lines located between adjacent twos of columns of sub-pixels exist between the upper substrate and the lower substrate, each of the sub-pixels is connected to the drive chip through a data line located on a side of it; two sub-pixels adjacent to each other constitute one pixel, or three sub-pixels adjacent to each other constitute two pixels, and the drive chip is configured to apply a data signal to corresponding sub-pixels through the data lines in a display period, so that at least one sub-pixel is shared by adjacent pixels;

the drive chip is also configured to judge a touch location by detecting a change in capacitance value of each of the self-capacitive electrodes in a touch period.

For example, in the in-cell touch panel, the wires and the data lines are disposed in a same layer.

For example, in the in-cell touch panel, the self-capacitive electrodes constitute a common electrode layer located on a side of the lower substrate facing the upper substrate;

the drive chip is also configured for loading of a common electrode signal onto each of the self-capacitive electrodes in a display period.

For example, in the in-cell touch panel, the plurality of sub-pixels is arranged as a plurality of pixel unit groups in a form of a matrix; wherein, each of the pixel unit groups includes two rows of sub-pixels arranged in a staggered manner, three sub-pixels in different colors are included in each row in the pixel unit group, and color of any three sub-pixels adjacent to each other on the lower substrate differs;

each of the data lines is connected to sub-pixels located on a same side of the data line in correspondence, or, each of the data lines is connected alternately with sub-pixels located on both sides of the data line in correspondence.

For example, in the in-cell touch panel, the plurality of sub-pixels is arranged as a plurality of pixel unit groups in a form of a matrix; wherein, each of the pixel unit groups includes two columns of sub-pixels arranged in a staggered manner, three sub-pixels in different colors are included in each column in the pixel unit group, and color of any three sub-pixels adjacent to each other on the lower substrate differs;

each of the data lines is connected to sub-pixels located on a same side of the data line in correspondence.

For example, in the in-cell touch panel, the plurality of sub-pixels is arranged as a plurality of pixel unit groups in a form of a matrix; wherein, each of the pixel unit groups includes four rows of sub-pixels arranged in the form of a matrix, and three sub-pixels in different colors are included in each row; wherein, a sequence of the first row is a first sub-pixel, a second sub-pixel and a third sub-pixel; a sequence of the second row is a third sub-pixel, a first sub-pixel and a second sub-pixel; a sequence of the third row is a second sub-pixel, a third sub-pixel and a first sub-pixel; and a sequence of the fourth row is a third sub-pixel, a first sub-pixel and a second sub-pixel;

each of the data lines is connected to sub-pixels located on a same side of the data line in correspondence.

For example, in the in-cell touch panel, the plurality of sub-pixels is arranged as a plurality of pixel unit groups in a form of a matrix; wherein, each of the pixel unit groups includes n rows of sub-pixels and n columns of sub-pixels arranged in a form of a matrix, for each row and each column in the pixel unit group, n sub-pixels in different colors are included in each of them, and sub-pixels along the direction of each diagonal line of the pixel unit group include at least two of the n sub-pixels, wherein, "n" is a positive integer greater than and equal to 3;

each of the data lines is connected to sub-pixels located on a same side of the data line in correspondence.

For example, in the in-cell touch panel, an extending direction of the wires is the same as an extending direction of the data lines.

For example, in the in-cell touch panel, the wires extending along a column direction, and sub-pixels located on a left side or right side of the wires have a same color.

For example, in the in-cell touch panel, the three sub-pixels in different colors are a red sub-pixel, a green sub-pixel and a blue sub-pixel, respectively.

For example, in the in-cell touch panel, n is equal to 4, and four sub-pixels in different colors are a red sub-pixel, a green sub-pixel and a blue sub-pixel and a white sub-pixel, respectively.

For example, in the in-cell touch panel, the lower substrate is an array substrate, and the upper substrate is a counter substrate.

For example, in the in-cell touch panel, the lower substrate is an array substrate, and the upper substrate is a cover plate or an encapsulating film.

According to an embodiment of the invention, there is further provided a display apparatus, comprising any of the above in-cell touch panels provided by embodiments of the invention.

For example, the display apparatus includes any one of a liquid crystal display panel and an organic electroluminescent display panel.

BRIEF DESCRIPTION OF THE DRAWINGS

In order to illustrate the technical solution of the embodiments of the invention more clearly, the drawings of the embodiments will be briefly introduced below; it is obvious that the drawings as described below are only related to some embodiments of the invention, but are not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

In a usual liquid crystal display apparatus and an organic light emitting diode (OLED) display apparatus, for each point (pixel), color is showed by light mixing of a plurality of sub-pixels. For example, each pixel includes one red sub-pixel, one green sub-pixel and one blue sub-pixel (RGB mode).

In order to improve the visual effect, people place higher and higher demands on resolution (the number of pixels within the unit size) of a display apparatus. In view of this, size of sub-pixels requires being smaller and smaller, but it cannot be reduced infinitely due to technological limitation.

Figure 8A:
FIG. 8a and FIG. 8b are other schematic views illustrating arranging rule of sub-pixels in an in-cell touch panel provided by an embodiment of the invention.
Figure 8B:
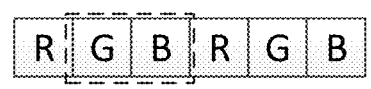

With the aim of improving the display effect in the case that size of sub-pixels is constant, a virtual display design of Pentile mode is proposed. In this mode, arranging manner of RGB (Red, Green, Blue) sub-pixels is a RGB Pentile waveform arranging manner, single pixel of the RGB waveform arrangement merely consists of two sub-pixels of "red and green" or "blue and green", as shown in FIG. 8a and FIG. 8b. When 3×3 pixels are displayed likewise, only 6 sub-pixels are made in the horizontal direction in the RGB waveform arranging manner, while 9 sub-pixels are made in the horizontal direction for the standard RGB sub-pixel arrangement. As compared with the standard RGB sub-pixel arranging manner, the number of sub-pixels employed in the RGB waveform arranging manner is reduced by ⅓. When an image is displayed actually, one pixel of RGB waveform arrangement will "borrow" another color of a pixel adjacent to it to form three primary colors, and each of pixels and an adjacent pixel share a sub-pixel in that color not possessed by itself, so as to achieve the white display jointly.

According to embodiments of the invention, based on the above visual display design, there is proposed a new in-cell touch panel structure that combines a virtual display technology and a touch-control technology together.

Hereinafter, in conjunction with drawings, specific embodiments of an in-cell touch panel and a display apparatus provided by embodiments of the invention will be described in detail.

The thickness and shape of film layers in drawings do not reflect the true scale, and the purpose is merely to schematically illustrate contents of the present invention.

Figure 1:
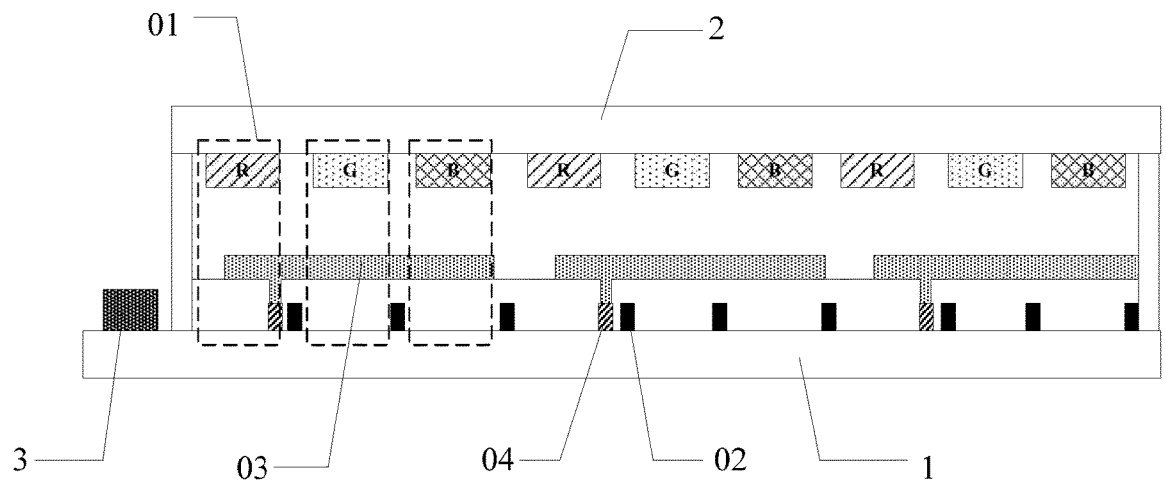
FIG. 1 is a structurally schematic view illustrating an in-cell touch panel provided by an embodiment of the invention.

An in-cell touch panel provided by an embodiment of the invention, as illustrated in FIG. 1, includes a lower substrate 1 and an upper substrate 2, as well as a drive chip 3. A number of sub-pixels 01 arranged regularly and data lines 02 located between adjacent two columns of sub-pixels 01 exist between the lower substrate 1 and the upper substrate 2. Each of the sub-pixels 01 is connected to the drive chip 3 through a data line 02 located on one side of it. Two sub-pixels 01 adjacent to each other constitute one pixel, or three sub-pixels 01 adjacent to each other constitute two pixels. The drive chip acts to apply a data signal to a corresponding sub-pixel 01 through a data line 02 in a display period, so that at least sub-pixel 01 is shared by adjacent pixels.

The in-cell touch panel further includes: a number of self-capacitive electrodes 03 independently of each other and located between the lower substrate 1 and the upper substrate 2; and wires 04 being configured to connect the self-capacitive electrodes 03 to the drive chip 3; the drive chip 3 being also configured to judge the touch location by detecting the change in capacitance value of each of the self-capacitive electrodes 03 in a touch period.

In some embodiments of the invention, two sub-pixels adjacent to each other constitute one pixel. For example, it may be case that, among sub-pixels in the same row, two sub-pixels constitute one pixel, and each of the pixels "borrow" a sub-pixel in another color of a pixel adjacent to it to form three primary colors. For example, each of pixels may "borrow" a sub-pixel in another color of a pixel adjacent to it among sub-pixels in the row to form three primary colors. But it is not limited to this.

In some embodiments of the invention, three sub-pixels adjacent to each other constitute two pixels. For example, it may be the case that, among sub-pixels in the same row, three sub-pixels constitute two pixels, and among three sub-pixels constituting the two pixels, one sub-pixel is shared by the two sub-pixels, each of pixels "borrow" a sub-pixel in another color of a pixel adjacent to it to form three primary colors. For example, each of pixels may "borrow" a sub-pixel in another color of a pixel adjacent to it among sub-pixels in the row. But it is not limited to this.

With respect to the above in-cell touch panel provided by embodiments of the invention, in view of the fact that each pixel only includes two sub-pixels or two pixels include three sub-pixels, as compared to the usual case that one pixel includes three sub-pixels or four sub-pixels, ⅓ or even ½ of the number of sub pixels can be reduced in the case that the same number of pixels is achieved. Accordingly, the number of data lines can be reduced by ⅓ or ½ as well. Therefore, channels of the drive chip originally used for that part of data lines to be reduced can now be useful for wires connected to self-capacitive electrodes. As a result, integration of touch control and display can be realized without adding channels of the drive chip, and in turn, cost of the in-cell touch panel is reduced.

For example, wires may be disposed in the same layer as data lines, and as such, they can be formed together with the data lines by one patterning process on the basis of a normal manufacturing process, without the need of adding an additional process for separate fabrication of wires. Consequently, the production cost is further saved, and the production efficiency is enhanced.

For example, in the in-cell touch panel, the lower substrate may be an array substrate, and the upper substrate may be a counter substrate. In this case, the in-cell touch panel is a liquid crystal display panel.

It is to be noted that, in the liquid crystal display panel, the counter substrate and the array substrate are disposed oppositely, and are upper and lower substrates of a display panel, respectively, and it is usual to form an array of thin film transistors and other display structure on the array substrate, and to form a color resin on the counter substrate. For example, the counter substrate is a color filter substrate.

For example, the in-cell touch panel may also be used for an electroluminescent display panel, and in this case, the lower substrate may be an array substrate, and the upper substrate may be a cover plate or an encapsulating film.

With respect to the above in-cell touch panel provided by embodiments of the invention, it is not only suitable for a liquid crystal display panel, but also suitable for an organic electroluminescent display panel, and no limit will be set here.

Further, in some specific embodiments, when the above in-cell touch panel is applied to liquid crystal display panels, it is not only suitable for Twisted Nematic (TN) mode liquid crystal display panels, but also suitable for Advanced Dimension Switch (ADS) mode liquid crystal display panels. Likewise, it is suitable for high-aperture-ratio High-Advanced Dimension Switch (HADS) mode liquid crystal display panels and In-Plane Switch (IPS) mode liquid crystal display panels.

Further, when the above in-cell touch panel provided by embodiments of the invention is applied to an ADS mode liquid crystal display panel, a common electrode layer with a plate-like structure is located below slit-like pixel electrodes. Namely, the common electrode are located between a lower substrate and pixel electrodes. Moreover, a passivation layer is further provided between the common electrodes and the pixel electrodes. While it is applied to a HADS mode liquid crystal display panel, slit-like common electrodes are located above a pixel electrode with a plate-like structure. Namely, the pixel electrode is located between a lower substrate and the common electrodes, and a passivation layer is further provided between the pixel electrode and the common electrodes.

For example, when the in-cell touch panel provided by embodiments of the invention is applied to a liquid crystal display panel of an ADS mode or a HADS mode, in order to simplify the manufacturing process and reduce the manufacturing cost, a common electrode layer located on a lower substrate may be multiplexed as self-capacitive electrodes. Namely, self-capacitive electrodes constitute a common electrode layer located on a side of a lower substrate facing an upper substrate, and the drive chip also serves for loading a common electrode signal onto each self-capacitive electrode in a display period. As such, in the event that structure of a common electrode layer is changed in such a way that it is divided into self-capacitive electrodes for achievement of a touch function, on the basis of a usual manufacturing process of array substrate, there is no need to add an additional process, so that the production cost can be saved, and the production efficiency is enhanced.

Figure 2A:
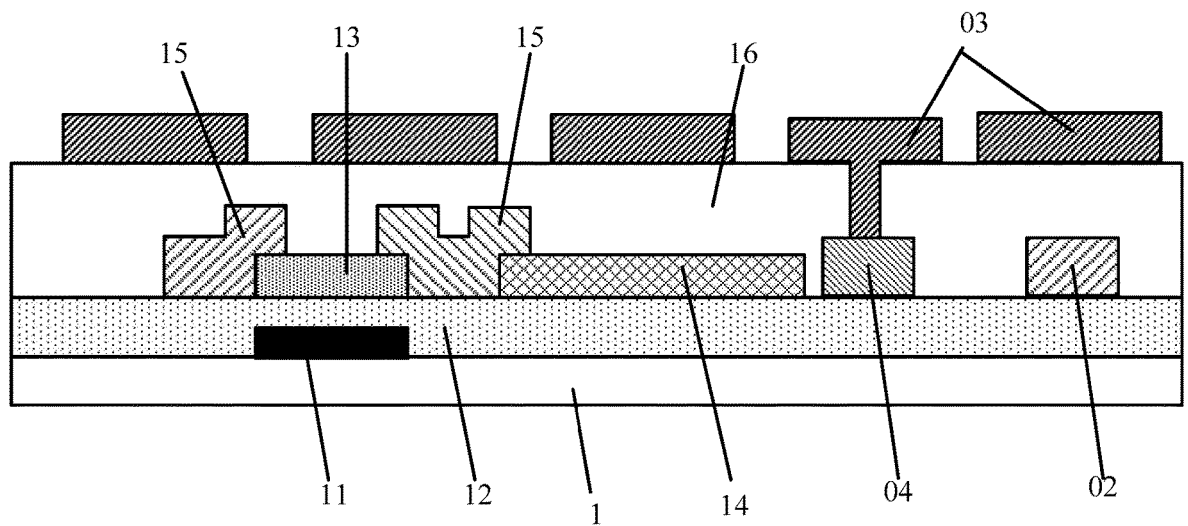
FIG. 2a is a structurally schematic view illustrating application of an in-cell touch panel provided by an embodiment of the invention to a liquid crystal display panel.
Figure 2B:
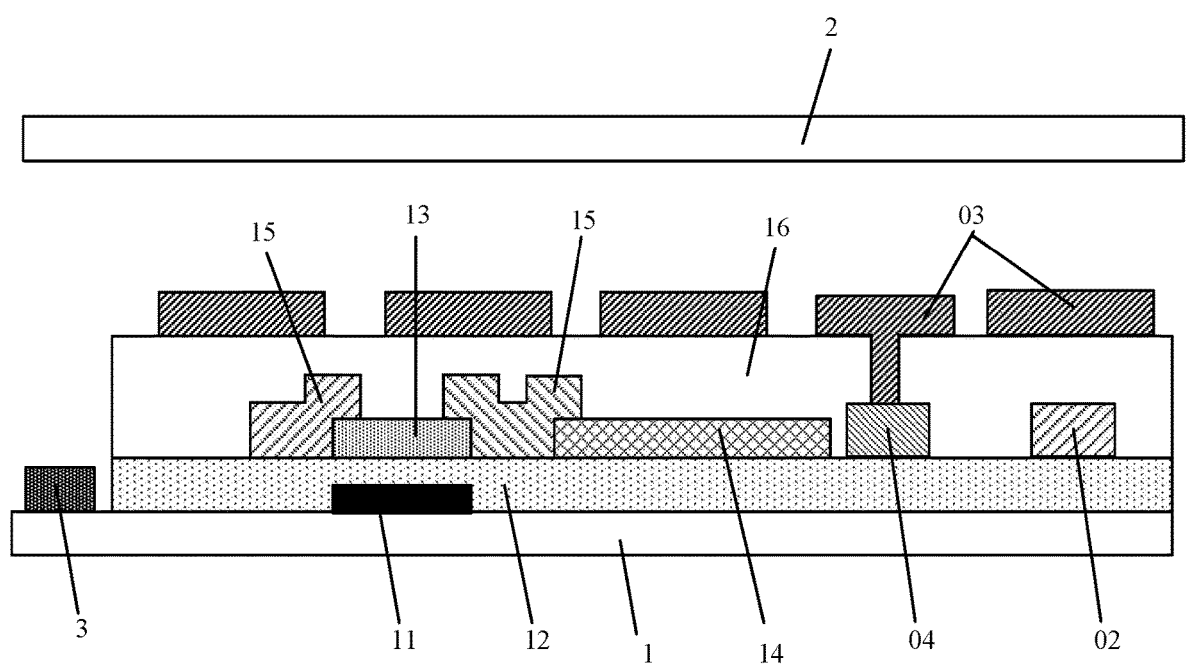
FIG. 2b is a structurally schematic view illustrating application of an in-cell touch panel provided by an embodiment of the invention to a liquid crystal display panel.

Hereinafter, the above in-cell touch panel will be described with reference to an example in which the in-cell touch panel provided by embodiments of the invention is applied to an HADS mode liquid crystal display panel. As illustrated in FIG. 2a and FIG. 2b, it includes an upper substrate 2 and a lower substrate 1 disposed oppositely, and a gate electrode 11, a gate insulating layer 12, an active layer 13 and a pixel electrode 14 disposed in the same layer and separately, source/drain electrode 15, a data line 02 and a wire 04 disposed in the same layer, a passivation layer 16 and a common electrode layer constituted by self-capacitive electrodes 03, which are located on the lower substrate 11 in sequence. A self-capacitive electrode 03 is electrically connected to the wire 04 through a via hole penetrating the passivation layer 16. Upon implementation, other essential components of a liquid crystal display panel are further included between the upper substrate and the lower substrate of the above in-cell touch panel, and each of these may make reference to usual design. Details are omitted here.

For example, in the above in-cell touch panel provided by embodiments of the invention, film layers on the lower substrate may be produced by using any of normal patterning flows. For example, a six-patterning process may be adopted: patterning of a gate electrode→patterning of an active layer→patterning of a pixel electrode→patterning of a data line, a wire and a source/drain electrode→patterning of a passivation layer ∝patterning of a common electrode layer. Certainly, it is also possible that according to the actual design, a five-patterning process, a seven-patterning process or an eight-patterning process is adopted, and no limit will be set here.

Further, the above in-cell touch panel provided by embodiments of the invention is suitable for any display apparatus in which sub-pixels are arranged in a virtual display design. Hereinafter, the specific arranging rule of sub-pixels in the above in-cell touch panel provided by embodiments of the invention will be described in detail by several embodiments.

First Embodiment

Figure 3A:
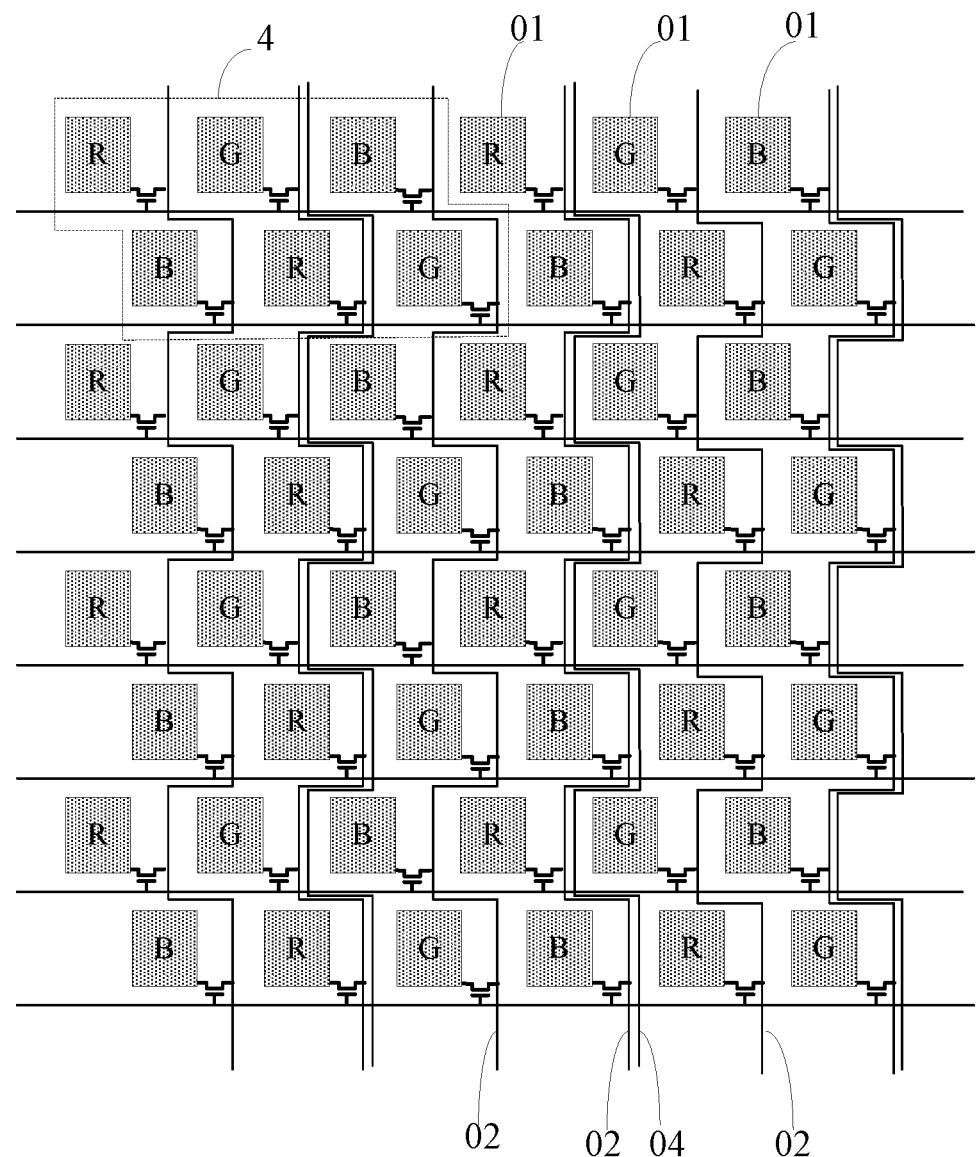
FIG. 3a and FIG. 3b are schematic views illustrating arranging rule of sub-pixels in an in-cell touch panel provided by a first embodiment of the invention.
Figure 3B:
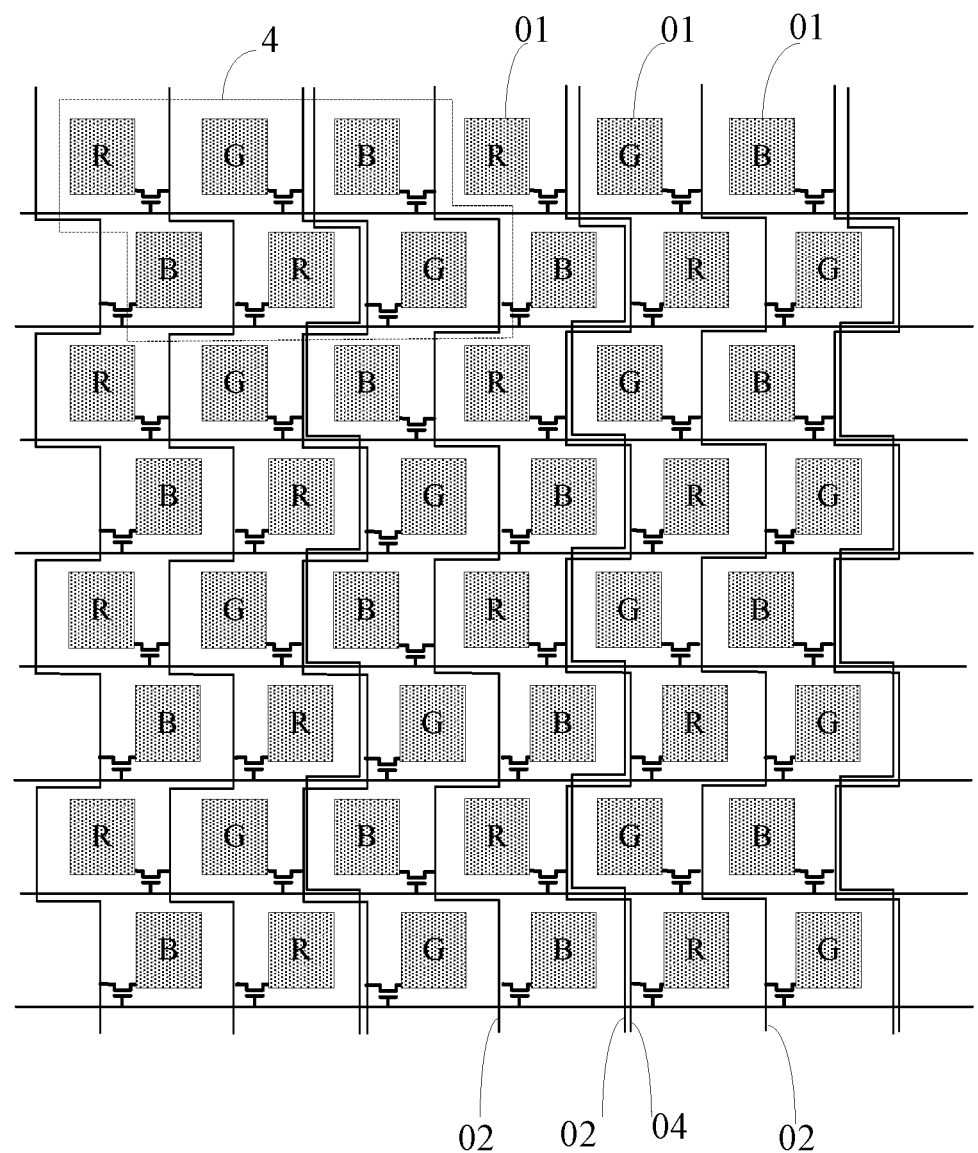

As regards an in-cell touch panel provided by embodiments of the invention, as illustrated in FIG. 3a and FIG. 3b, the arranging rule of a number of sub-pixels 01 is that, a number of pixel unit groups 4 are arranged in the form of a matrix.

Each of the pixel unit groups 4 includes two rows of sub-pixels 01 arranged in a staggered manner, three sub-pixels 01 in different colors are included in each row in a pixel unit group 4, and color of any three sub-pixels 01 adjacent to each other on a lower substrate differs.

As illustrated in FIG. 3a, each data line 02 is connected to sub-pixels 01 located on the same side of the data line 02 in correspondence. That is, thin film transistors (TFTs) for connecting a data line 02 and sub-pixels 01 are each located on the same side of the six-pixels.

Alternatively, as illustrated in FIG. 3b, each data line 02 is connected alternately with sub-pixels located on both sides of the data line 02 in correspondence. That is, thin film transistors in odd rows for connecting a data line and sub-pixels are located on one side of sub-pixels in corresponding rows, and thin film transistors in even rows for connecting a data line and sub-pixels are located on the other side of sub-pixels in corresponding rows.

Further, in the above in-cell touch panel provided by embodiments of the invention, as illustrated in FIG. 3a and FIG. 3b, three sub-pixels 01 in different colors are a red (R) sub-pixel, a green (G) sub-pixel and a blue (B) sub-pixel, respectively. As such, upon display, two adjacent sub-pixels serve as a pixel, or three sub-pixels adjacent to each other constitute two groups, and each of pixels "borrow" a sub-pixel in another color of a pixel adjacent to it to form three primary colors. Each of pixels and an adjacent pixel share a sub-pixel in that color not possessed by itself, so as to achieve the white display jointly.

For example, in the above in-cell touch panel, for the sake of reducing the manufacturing difficulty, as illustrated in FIG. 3a and FIG. 3b, extending direction of wires 04 is the same as extending direction of data lines 02.

With respect to the above in-cell touch panel provided by embodiments of the invention, in view of the fact that each of pixels only includes two sub-pixels or two pixels include three sub-pixels, as compared with the usual case that one pixel includes three sub-pixels or four sub-pixels, ⅓ or even ½ of the number of sub-pixels can be reduced in the event that the same pixel is achieved. Accordingly, the number of data lines can be reduced by ⅓ or ½ as well. Therefore, channels of a drive chip originally used for that part of data lines to be reduced can now be useful for wires connected to self-capacitive electrodes. As a result, integration of touch control and display can be realized without adding channels of the drive chip, and in turn, cost of the in-cell touch panel is reduced.

Second Embodiment

Figure 4:
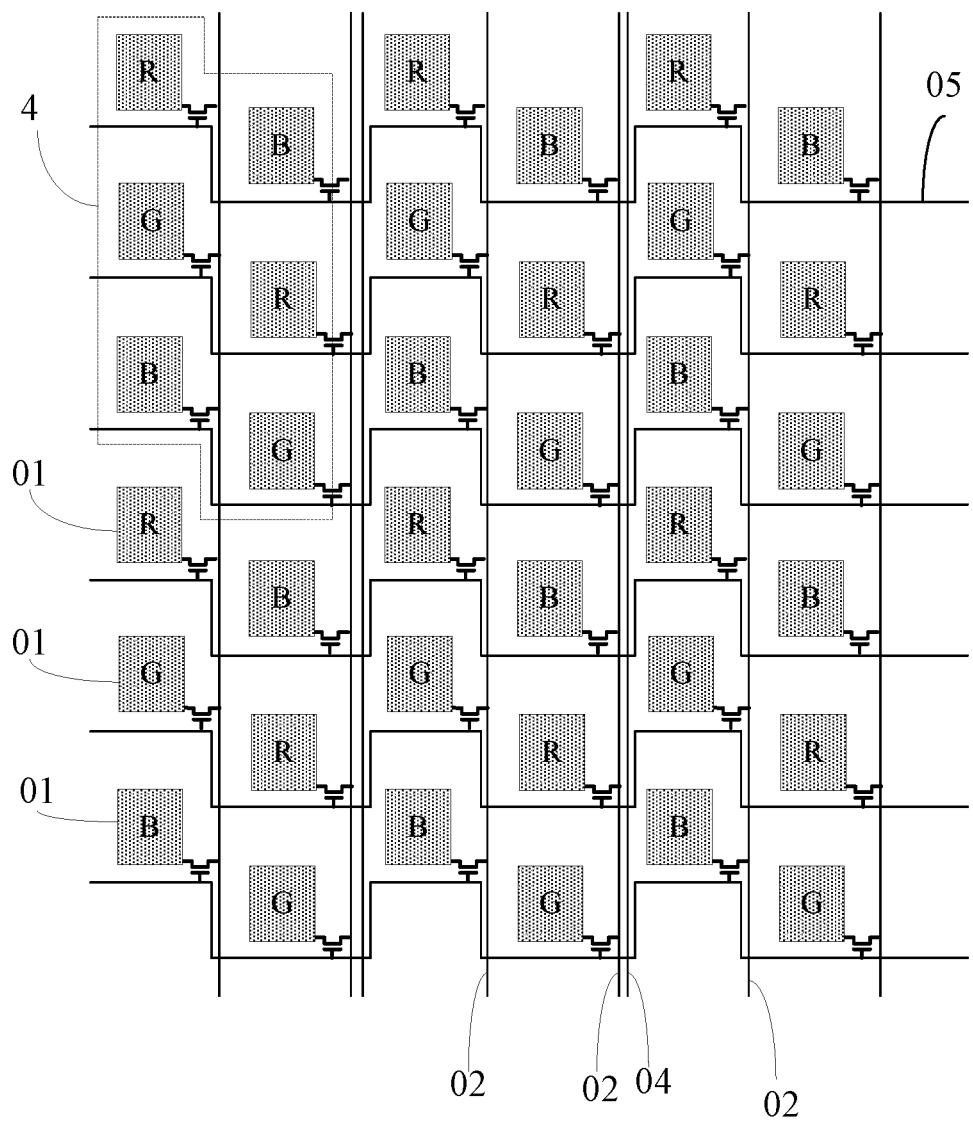
FIG. 4 is a schematic view illustrating arranging rule of sub-pixels in an in-cell touch panel provided by a second embodiment of the invention.

As regards an in-cell touch panel provided by embodiments of the invention, as illustrated in FIG. 4, the arranging rule of a number of sub-pixels 01 is that, a number of pixel unit groups 4 are arranged in the form of a matrix.

Each of the pixel unit groups 4 includes two columns of sub-pixels 01 arranged in a staggered manner, three sub-pixels 01 in different colors are included in each column in a pixel unit group 4, and color of any three sub-pixels 01 adjacent to each other on a lower substrate differs.

For example, each data line 02 is connected to sub-pixels 01 located on the same side of the data line 02 in correspondence.

Further, in the above in-cell touch panel, as illustrated in FIG. 4, a gate line 05 is located between sub-pixels 01 in an odd row and sub-pixels in an even row that are adjacent, and is electrically connected to sub-pixels 01 located on the same side of the gate line 05.

Further, in the above in-cell touch panel provided by embodiments of the invention, as illustrated in FIG. 4, three sub-pixels 01 in different colors are a red (R) sub-pixel, a green (G) sub-pixel and a blue (B) sub-pixel, respectively. As such, upon display, two adjacent sub-pixels serve as a pixel, or three sub-pixels adjacent to each other constitute two groups, and each of pixels "borrow" a sub-pixel in another color of a pixel adjacent to it to form three primary colors. That is, each of pixels and an adjacent pixel share a sub-pixel in that color not possessed by itself, so as to achieve the white display jointly.

For example, in the above in-cell touch panel, for the sake of reducing the manufacturing difficulty, as illustrated in FIG. 4, extending direction of wires 04 is the same as extending direction of data lines 02.

With respect to the above in-cell touch panel provided by embodiments of the invention, in view of the fact that each of pixels only includes two sub-pixels or two pixels include three sub-pixels, as compared with the usual case that one pixel includes three sub-pixels or four sub-pixels, ⅓ or even ½ of the number of sub-pixels can be reduced in the event that the same pixel is achieved. Accordingly, the number of data lines can be reduced by ⅓ or ½ as well. Therefore, channels of a drive chip originally used for that part of data lines to be reduced can now be useful for wires connected to self-capacitive electrodes. As a result, integration of touch control and display can be realized without adding channels of the drive chip, and in turn, cost of the in-cell touch panel is reduced.

Third Embodiment

Figure 5A:
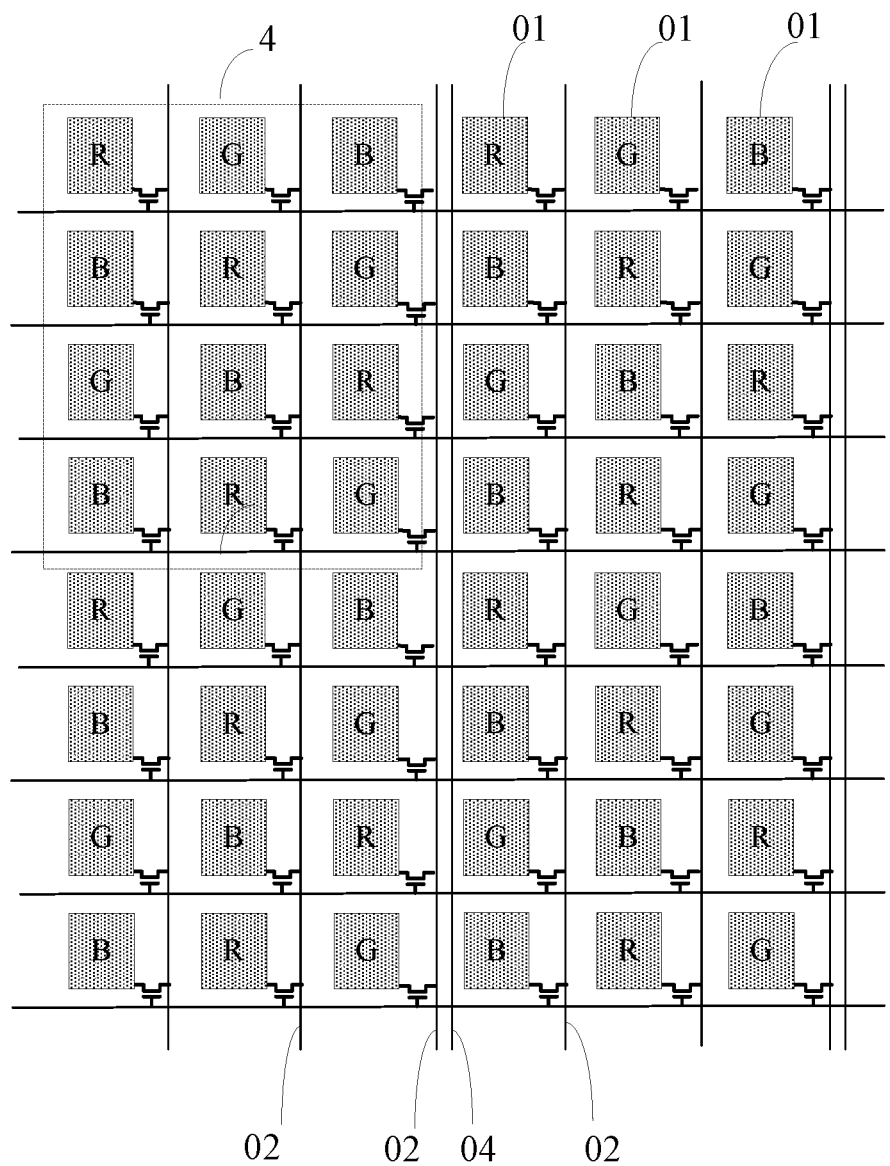
FIG. 5a and FIG. 5b are schematic views illustrating arranging rule of sub-pixels in an in-cell touch panel provided by a third embodiment of the invention.
Figure 5B:
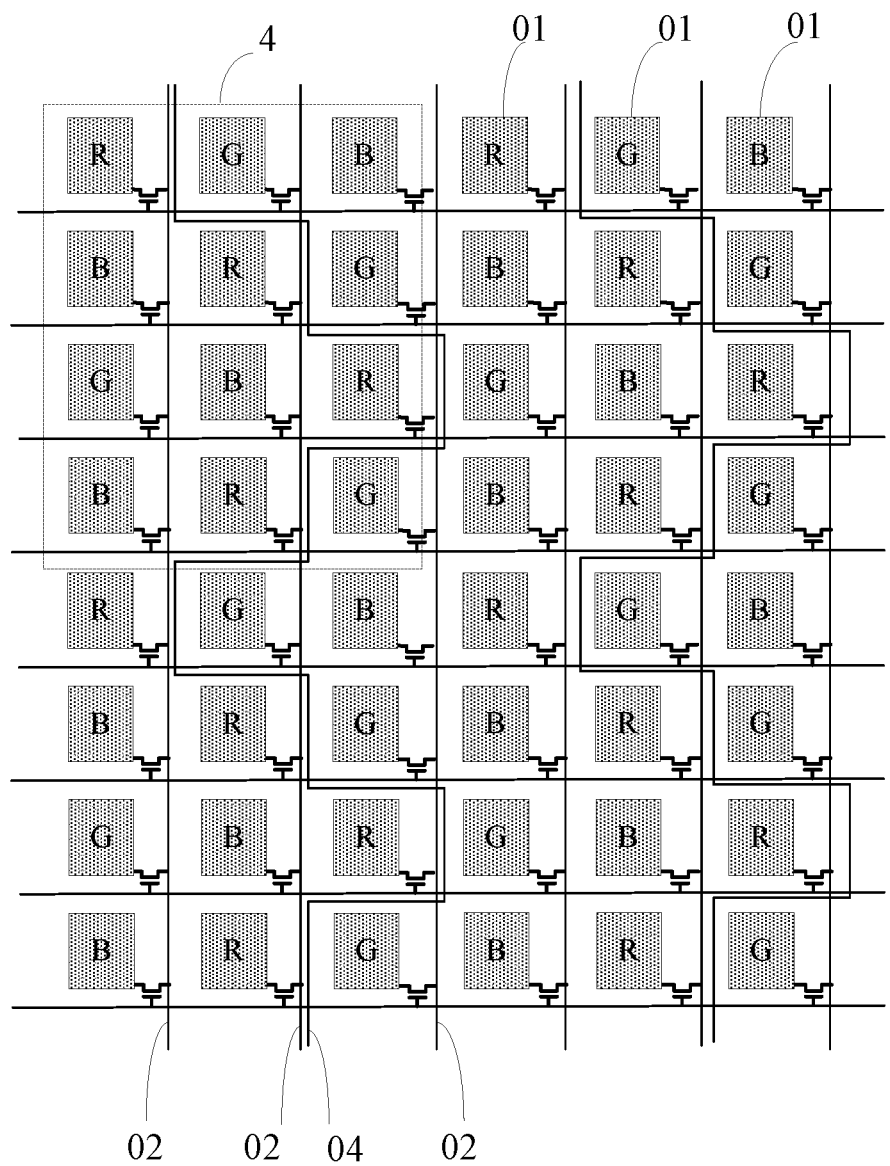

As regards an in-cell touch panel provided by embodiments of the invention, as illustrated in FIG. 5a and FIG. 5b, the arranging rule of a number of sub-pixels 01 is that, a number of pixel unit groups 4 are arranged in the form of a matrix.

Each of the pixel unit groups 4 includes four rows of sub-pixels 01 arranged in the form of a matrix, and three sub-pixels 01 in different colors are included in each row.

The sequence of the first row is a first sub-pixel, a second sub-pixel and a third sub-pixel; the sequence of the second row is a third sub-pixel, a first sub-pixel and a second sub-pixel; the sequence of the third row is a second sub-pixel, a third sub-pixel and a first sub-pixel; and the sequence of the fourth row is a third sub-pixel, a first sub-pixel and a second sub-pixel.

For example, each data line 02 is connected to sub-pixels 01 located on the same side of the data line 02 in correspondence.

Further, in the above in-cell touch panel provided by embodiments of the invention, as illustrated in FIG. 5a and FIG. 5b, three sub-pixels 01 in different colors are a red (R) sub-pixel, a green (G) sub-pixel and a blue (B) sub-pixel, respectively. As such, upon display, two adjacent sub-pixels serve as a pixel, and each of pixels "borrow" a sub-pixel in another color of a pixel adjacent to it to form three primary colors. That is, each of pixels and an adjacent pixel share a sub-pixel in that color not possessed by itself, so as to achieve the white display jointly.

Further, upon implementation, the first sub-pixel may be one of a red sub-pixel, a green sub-pixel and a blue sub-pixel, and likewise, the second sub-pixel and the third sub-pixel may also be one of a red sub-pixel, a green sub-pixel and a blue sub-pixel, as long as it is ensured that the first sub-pixel, the second sub-pixel and the third sub-pixel have different colors. No limit will be set here.

For example, in the above in-cell touch panel, for the sake of reducing the manufacturing difficulty, as illustrated in FIG. 5a, extending direction of wires 04 is the same as extending direction of data lines 02.

Alternatively, upon implementation, in order to ensure that the aperture ratio of sub-pixels in the same color are uniform, as illustrated in FIG. 5b, in the above in-cell touch panel, wires 04 extend along a column direction, and sub-pixels 01 located on a left side or right side of a wire 04 have the same color.

Further, upon implementation, as illustrated in FIG. 5b, when a wire extends along the extending direction of sub-pixels of the same color, in order to avoid contact of the wire with a data line, at the location where the wire overlaps the data line, a transparent conductive material is adopted by the wire for jumper connection.

With respect to the above in-cell touch panel provided by embodiments of the invention, in view of the fact that each of pixels only includes two sub-pixels, as compared with the usual case that one pixel includes three sub-pixels or four sub-pixels, ⅓ of the number of sub-pixels can be reduced in the event that the same pixel is achieved. Accordingly, the number of data lines can be reduced by ⅓ as well. Therefore, channels of a drive chip originally used for that part of data lines to be reduced can now be useful for wires connected to self-capacitive electrodes. As a result, integration of touch control and display can be realized without adding channels of the drive chip, and in turn, cost of the in-cell touch panel is reduced.

Fourth Embodiment

Figure 6:
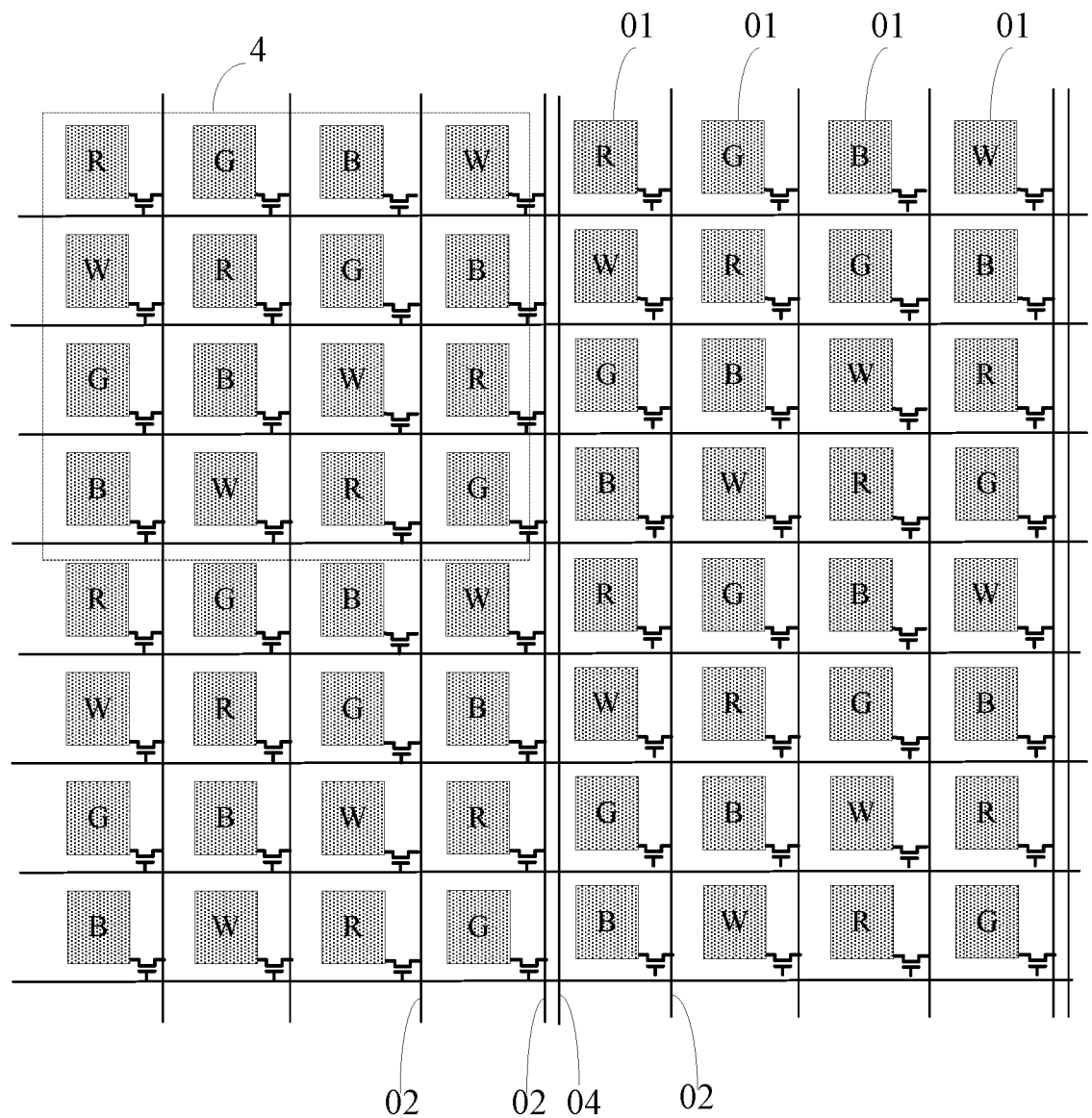
FIG. 6 is a schematic view illustrating arranging rule of sub-pixels in an in-cell touch panel provided by a fourth embodiment of the invention.

As regards an in-cell touch panel provided by embodiments of the invention, as illustrated in FIG. 6, the arranging rule of a number of sub-pixels 01 is that, a number of pixel unit groups 4 are arranged in the form of a matrix.

Each of the pixel unit groups 4 includes n rows of sub-pixels 01 and n columns of sub-pixels 01 arranged in the form of a matrix, for each row and each column in a pixel unit group 4, n sub-pixels 01 in different colors are included in each of them, and sub-pixels along the direction of each diagonal line of a pixel unit group 04 include at least two of the n sub-pixels 01. "n" is a positive integer greater than and equal to 3.

For example, each data line 02 is connected to sub-pixels 01 located on the same side of the data line 02 in correspondence.

For example, in the above in-cell touch panel provided by embodiments of the invention, as illustrated in FIG. 6, n is equal to 4, and four sub-pixels in different colors are a red (R) sub-pixel, a green (G) sub-pixel and a blue (B) sub-pixel and a white (W) sub-pixel, respectively. As such, upon display, two adjacent sub-pixels serve as a pixel, and each of pixels "borrow" a sub-pixel in another color of a pixel adjacent to it to form three primary colors. That is, each of pixels and an adjacent pixel share a sub-pixel in that color not possessed by itself, so as to achieve the white display jointly.

For example, in the above in-cell touch panel, for the sake of reducing the manufacturing difficulty, as illustrated in FIG. 6, extending direction of wires 04 is the same as extending direction of data lines 02.

With respect to the above in-cell touch panel provided by embodiments of the invention, in view of the fact that each of pixels only includes two sub-pixels, as compared with the usual case that one pixel includes three sub-pixels or four sub-pixels, ⅓ of the number of sub-pixels can be reduced in the event that the same pixel is achieved. Accordingly, the number of data lines can be reduced by ⅓ as well. Therefore, channels of a drive chip originally useful for that part of data lines to be reduced can now be used for wires connected to self-capacitive electrodes. As a result, integration of touch control and display can be realized without adding channels of the drive chip, and in turn, cost of the in-cell touch panel is reduced.

Generally, the density of a touch panel is usually on the order of millimeters. Thus, upon implementation, the density and occupied area of self-capacitive electrodes may be selected according to the required touch density so as to ensure the required touch density. In general, each self-capacitive electrode is designed to be a square electrode of about 5 mm×5 mm. The density of a display panel is usually on the order of micrometers. Therefore, one self-capacitive electrode will generally correspond to a plurality of sub-pixels in the display panel.

For example, as a common electrode layer can be multiplexed as self-capacitive electrodes in the above touch panel provided by embodiments of the invention, in the event that a common electrode layer is multiplexed as self-capacitive electrodes, with the aim of reducing the mutual interference between display and touch control signals, upon implementation, it is required that a manner of time-division driving at touch control and display stages be adopted.

Figure 7A:
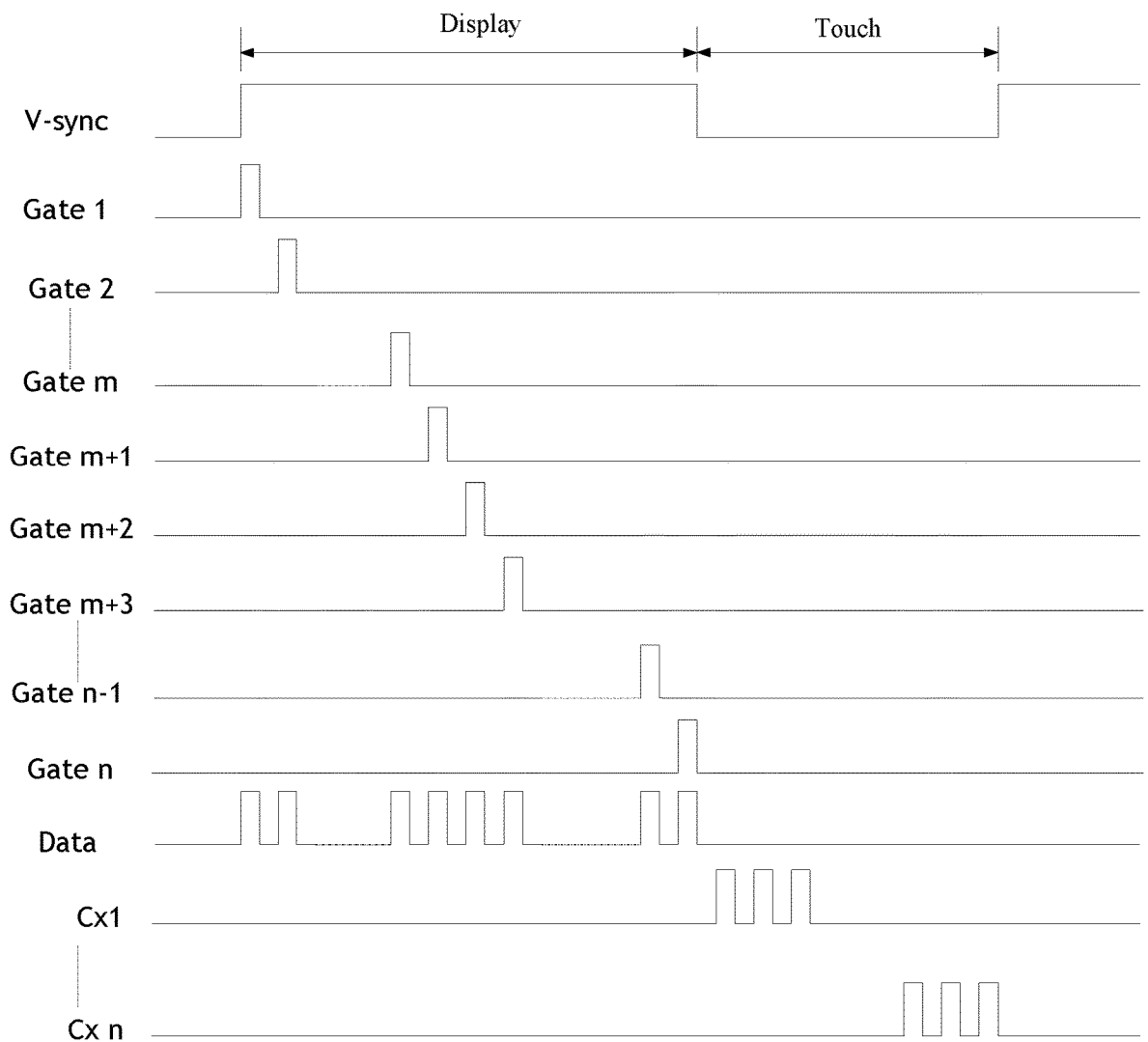
FIG. 7a and FIG. 7b are schematic views respectively illustrating the driving timing of an in-cell touch panel provided by an embodiment of the invention.
Figure 7B:
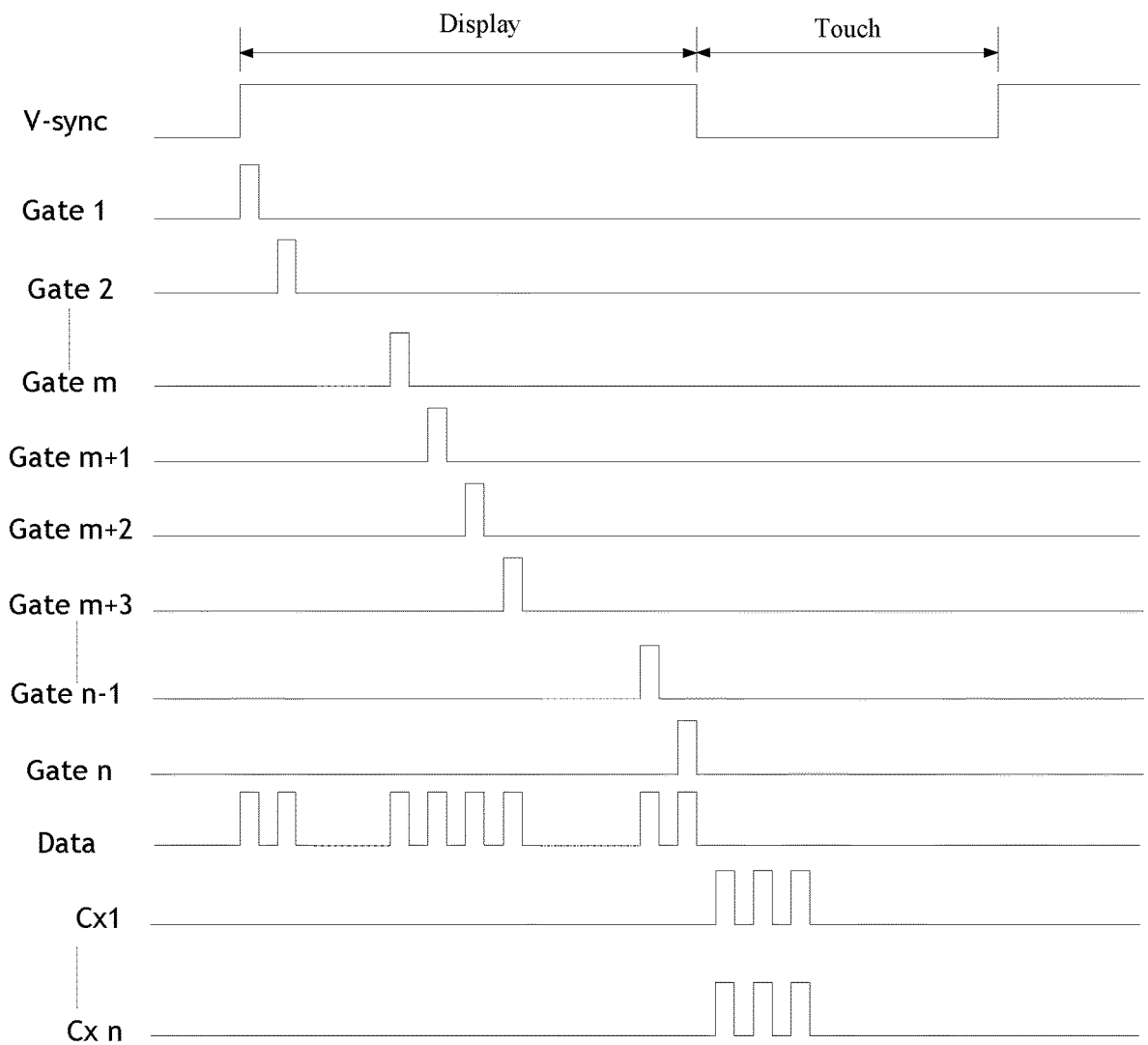

For example, in the drive timing diagrams illustrated in FIG. 7a and FIG. 7b, the time for display of each frame (V-sync) of the touch panel is divided into a display time period (Display) and a touch time period (Touch). For example, in the drive timing diagrams as illustrated in FIG. 7a and FIG. 7b, the time for display of one frame of the touch panel is 16.7 ms, and it is possible that 5 ms of it is chosen as the touch time period, and the remaining 11.7 ms serves as the display time period. Of course, the durations of the two may also be appropriately adjusted according to the processing capacity of an IC chip, and they will not be specifically limited here. At the display time period (Display), a gate scanning signal is applied to each of gate signal lines Gate1, Gate2, ... Gate n in the touch panel in sequence, a gray-scale signal is applied to a data signal line Data, and a common electrode signal is provided to self-capacitive electrodes Cx1, . . . Cxn, respectively, by a touch detection chip connected to the self-capacitive electrodes Cx1, . . . Cxn, so as to achieve a liquid crystal display function. At the touch time period (Touch), as illustrated in FIG. 7b, the touch detection chip connected to the self-capacitive electrodes Cx1, . . . Cxn act to apply driving signals to the self-capacitive electrodes Cx1, . . . Cxn simultaneously, and meanwhile receive feedback signals of the self-capacitive electrodes Cx1, . . . Cxn; there may also be the case that, as illustrated in FIG. 7a, the touch detection chip connected to the self-capacitive electrodes Cx1, . . . Cxn act to apply driving signals to the self-capacitive electrodes Cx1, . . . Cxn in sequence, and respectively receive feedback signals of the self-capacitive electrodes Cx1, . . . Cxn. No limit will be set here. Whether or not a touch occurs is judged by analyzing the feedback signals, so as to achieve a touch control function.

Base on the same inventive concept, according to an embodiment of the invention, there is further provided a display apparatus, which includes any of the above-mentioned in-cell touch panel provided by embodiments of the invention.

For example, the display apparatus includes any one of a liquid crystal display panel and an organic electroluminescent display panel.

For example, the display apparatus may be a liquid crystal display, an electronic paper, an OLED (Organic Light-Emitting Diode) display or other display device as well as a cell phone, a watch, a tablet computer, a television, a tablet computer, a notebook computer, a digital photo frame, a navigator or any other product or component having a display function. Regarding implementation of the display apparatus, reference to above embodiments of the in-cell touch panel can be made, and repetitions are omitted here.

With respect to an in-cell touch panel and a display apparatus provided by embodiments of the invention, each of pixels only includes two sub-pixels or two pixels include three sub-pixels. Thus, as compared with the usual case that one pixel includes three sub-pixels or four sub-pixels, ⅓ or even ½ of the number of sub-pixels can be reduced in the event that the same result is achieved. Accordingly, the number of data lines can be reduced by ⅓ or ½ as well. Therefore, channels of a drive chip originally used for that part of data lines to be reduced can now be useful for wires connected to self-capacitive electrodes. As a result, integration of touch control and display can be realized without adding channels of the drive chip, and in turn, cost of the in-cell touch panel is reduced. Furthermore, in the event that wires are disposed in the same layer as data lines, they can be formed together with the data lines by one patterning process on the basis of an existing manufacturing process, without the need of adding an additional process for separate fabrication of wires. Consequently, the production cost is further saved, and the production efficiency is enhanced.

Descriptions made above are merely specific embodiments of the present invention, but the protection scope of the invention is not limited thereto. Changes or replacements, as easily conceivable by those skilled in the art within the technical scope disclosed by the invention, shall be encompassed within the protection scope of the invention. Therefore, the protection scope of the invention shall be determined by the protection scope of attached claims.

This patent application claims the benefit of priority from Chinese patent application No. 201510038744.7, filed on Jan. 26, 2015, the disclosure of which is incorporated herein in its entirety by reference as a part of the present application.

The invention claimed is:

1. An in-cell touch panel, comprising an upper substrate and a lower substrate disposed oppositely, a plurality of self-capacitive electrodes independently of each other and located between the lower substrate and the upper substrate, a drive chip, and wires being configured to connect the self-capacitive electrodes to the drive chip,
   wherein, a plurality of sub-pixels arranged regularly and data lines located between adjacent twos of columns of sub-pixels are disposed between the upper substrate and the lower substrate, each of the sub-pixels is connected to the drive chip through a data line located on a side of it; sub-pixels of a red sub-pixel and a green sub-pixel or a blue sub-pixel and a green sub-pixel constitute one pixel, and the drive chip is configured to apply a data signal to corresponding sub-pixels through the data lines in a display period, so that one pixel shares a sub-pixel in another color of an adjacent pixel to form three primary colors;
   the drive chip is also configured to judge a touch location by detecting a change in capacitance value of each of the self-capacitive electrodes in a touch period,
   wherein, the plurality of sub-pixels is arranged as a plurality of pixel unit groups in a form of a matrix; wherein,
   each of the pixel unit groups includes two columns of sub-pixels arranged in a staggered manner, three sub-pixels in different colors are included in each column in the pixel unit group, and color of any three sub-pixels adjacent to each other on the lower substrate differs;
   each of the data lines is connected to sub-pixels located on a same side of the data line in correspondence.

2. The in-cell touch panel according to claim 1, wherein the wires and the data lines are disposed in a same layer.

3. The in-cell touch panel according to claim 1, wherein the self-capacitive electrodes constitute a common electrode layer located on a side of the lower substrate facing the upper substrate;
   the drive chip is also configured for loading of a common electrode signal onto each of the self-capacitive electrodes in a display period.

4. The in-cell touch panel according to claim 1, wherein the plurality of sub-pixels is arranged as a plurality of pixel unit groups in a form of a matrix; wherein,
   each of the pixel unit groups includes two rows of sub-pixels arranged in a staggered manner, three sub-pixels in different colors are included in each row in the pixel unit group, and color of any three sub-pixels adjacent to each other on the lower substrate differs;
   each of the data lines is connected to sub-pixels located on a same side of the data line in correspondence, or, each of the data line is connected alternately with sub-pixels located on both sides of the data line in correspondence.

5. The in-cell touch panel according to claim 1, wherein, an extending direction of the wires is the same as an extending direction of the data lines.

6. The in-cell touch panel according to claim 1, wherein the three sub-pixels in different colors are a red sub-pixel, a green sub-pixel and a blue sub-pixel, respectively.

7. The in-cell touch panel according to claim 1, wherein the lower substrate is an array substrate, and the upper substrate is a counter substrate.

8. The in-cell touch panel according to claim 1, wherein the lower substrate is an array substrate, and the upper substrate is a cover plate or an encapsulating film.

9. A display apparatus, comprising the in-cell touch panel according to claim 1.

10. The display apparatus according to claim 9, wherein, the display apparatus includes any one of a liquid crystal display panel and an organic electroluminescent display panel.

11. The display apparatus according to claim 9, wherein, the wires and the data lines are disposed in a same layer.

12. The display apparatus according to claim 9, wherein, the self-capacitive electrodes constitute a common electrode layer located on a side of the lower substrate facing the upper substrate;
the drive chip is also configured for loading of a common electrode signal onto each of the self-capacitive electrodes in a display period.

13. The display apparatus according to claim 9, wherein, the plurality of sub-pixels is arranged as a plurality of pixel unit groups in a form of a matrix; wherein,
each of the pixel unit groups includes two rows of sub-pixels arranged in a staggered manner, three sub-pixels in different colors are included in each row in the pixel unit group, and color of any three sub-pixels adjacent to each other on the lower substrate differs;
each of the data lines is connected to sub-pixels located on a same side of the data line in correspondence, or, each of the data line is connected alternately with sub-pixels located on both sides of the data line in correspondence.

14. An in-cell touch panel, comprising an upper substrate and a lower substrate disposed oppositely, a plurality of self-capacitive electrodes independently of each other and located between the lower substrate and the upper substrate, a drive chip, and wires being configured to connect the self-capacitive electrodes to the drive chip,
wherein, a plurality of sub-pixels arranged regularly and data lines located between adjacent twos of columns of sub-pixels are disposed between the upper substrate and the lower substrate, each of the sub-pixels is connected to the drive chip through a data line located on a side of it; two sub-pixels of a red sub-pixel and a green sub-pixel or a blue sub-pixel and a green sub-pixel constitute one pixel, and the drive chip is configured to apply a data signal to corresponding sub-pixels through the data lines in a display period, so that one pixel shares a sub-pixel in another color of an adjacent pixel to form three primary colors;
the drive chip is also configured to judge a touch location by detecting a change in capacitance value of each of the self-capacitive electrodes in a touch period,
wherein the plurality of sub-pixels is arranged as a plurality of pixel unit groups in a form of a matrix; wherein,
each of the pixel unit groups includes four rows of sub-pixels arranged in a form of a matrix, and three sub-pixels in different colors are included in each row; wherein, a sequence of the first row is a first sub-pixel, a second sub-pixel and a third sub-pixel; a sequence of the second row is a third sub-pixel, a first sub-pixel and a second sub-pixel; a sequence of the third row is a second sub-pixel, a third sub-pixel and a first sub-pixel; and a sequence of the fourth row is a third sub-pixel, a first sub-pixel and a second sub-pixel;
each of the data lines is connected to sub-pixels located on a same side of the data line in correspondence.

15. The in-cell touch panel according to claim 14, wherein the wires extending along a column direction, and sub-pixels located on a left side or right side of the wires have a same color.

16. The in-cell touch panel according to claim 14, wherein the wires and the data lines are disposed in a same layer.

17. A display apparatus, comprising the in-cell touch panel according to claim 14.

18. An in-cell touch panel, comprising an upper substrate and a lower substrate disposed oppositely, a plurality of self-capacitive electrodes independently of each other and located between the lower substrate and the upper substrate, a drive chip, and wires being configured to connect the self-capacitive electrodes to the drive chip,
wherein, a plurality of sub-arranged regularly and data lines located between adjacent twos of columns of sub-pixels are disposed between the upper substrate and the lower substrate, each of the sub-pixels is connected to the drive chip through a data line located on a side of it; two sub-pixels of a red sub-pixel and a green sub-pixel or a blue sub-pixel and a green sub-pixel constitute one pixel, and the drive chip is configured to apply a data signal to corresponding sub-pixels through the data lines in a display period, so that one pixel shares a sub-pixel in another color of an adjacent pixel to form three primary colors;
the drive chip is also configured to judge a touch location by detecting a change in capacitance value of each of the self-capacitive electrodes in a touch period,
wherein, the plurality of sub-pixels is arranged as a plurality of pixel unit groups in a form of a matrix; wherein,
each of the pixel unit groups includes n rows of sub-pixels and n columns of sub-pixels arranged in a form of a matrix, for each row and each column in the pixel unit group, n sub-pixels in different colors are included in each of them, and sub-pixels along the direction of each diagonal line of the pixel unit group include at least two of the n sub-pixels, wherein, "n" is a positive integer greater than and equal to 3;
each of the data lines is connected to sub-pixels located on a same side of the data line in correspondence.

19. The in-cell touch panel according to claim 18, wherein n is equal to 4, and four sub-pixels in different colors are a red sub-pixel, a green sub-pixel and a blue sub-pixel and a white sub-pixel, respectively.

20. A display apparatus, comprising the in-cell touch panel according to claim 18.

* * * * *